United States Patent
Walker et al.

(10) Patent No.: US 9,168,674 B2
(45) Date of Patent: Oct. 27, 2015

(54) LIQUID RECLAMATION AND RECIRCULATION SYSTEM FOR A WET SAW CUTTING APPARATUS

(71) Applicant: WINEGARDNER MASONRY, INC., Yucaipa, CA (US)

(72) Inventors: Gregory J. Walker, Highland, CA (US); Peter A. Rodriguez, Yucaipa, CA (US)

(73) Assignee: WINEGARDNER MASONRY, INC., Yucaipa, CA (US)

(*) Notice: Subject to any disclaimer, the term of this patent is extended or adjusted under 35 U.S.C. 154(b) by 77 days.

(21) Appl. No.: 14/056,879

(22) Filed: Oct. 17, 2013

(65) Prior Publication Data

US 2015/0107571 A1    Apr. 23, 2015

(51) Int. Cl.
*B28D 7/02*    (2006.01)
*B23D 59/02*    (2006.01)
*B24B 55/03*    (2006.01)

(52) U.S. Cl.
CPC ........ *B28D 7/02* (2013.01); *B23D 59/02* (2013.01); *B24B 55/03* (2013.01)

(58) Field of Classification Search
CPC ...... B01D 21/02; B23D 59/02; B23D 59/025; B24B 55/03; B24B 27/02; B24C 9/006; B28D 1/04; B28D 1/025; B28D 5/007; B28D 7/02

USPC ............. 125/13.01; 137/575, 576; 210/195.1, 210/805, 806; 451/87, 88, 447, 450
See application file for complete search history.

(56) References Cited

U.S. PATENT DOCUMENTS

| | | | | |
|---|---|---|---|---|
| 3,341,983 A | * | 9/1967 | Baldenhofer et al. | 451/450 |
| 3,553,895 A | * | 1/1971 | Power | 451/87 |
| 4,362,628 A | * | 12/1982 | Kennedy et al. | 210/712 |
| 4,646,485 A | * | 3/1987 | Ashworth | 451/88 |
| 5,223,156 A | * | 6/1993 | Maier | 210/800 |
| 5,331,769 A | * | 7/1994 | Walton | 451/249 |
| 5,445,730 A | * | 8/1995 | Pattee | 210/167.31 |
| 5,545,074 A | * | 8/1996 | Jacobs | 451/40 |
| 5,641,409 A | * | 6/1997 | Onandia | 210/739 |
| 5,980,735 A | * | 11/1999 | Bratten | 210/87 |
| 6,557,602 B1 | * | 5/2003 | Sorensen et al. | 144/286.5 |

* cited by examiner

*Primary Examiner* — Timothy V Eley
(74) *Attorney, Agent, or Firm* — One LLP

(57) ABSTRACT

A liquid reclamation and recirculation system for a wet saw cutting apparatus comprising: a wet saw having a blade onto which liquid is dispensed by a liquid dispenser adjacent thereto; a first tank for receiving the liquid that has been dispensed onto the blade, the liquid received by the first tank defining a water level of the first tank; a second tank for receiving the liquid at or near the water level of the first tank; wherein the liquid dispensed by the liquid dispenser is drawn from the second tank.

7 Claims, 4 Drawing Sheets

LIQUID RECLAMATION AND RECIRCULATION SYSTEM FOR A WET SAW CUTTING APPARATUS

BACKGROUND OF THE INVENTION

Figure 1:
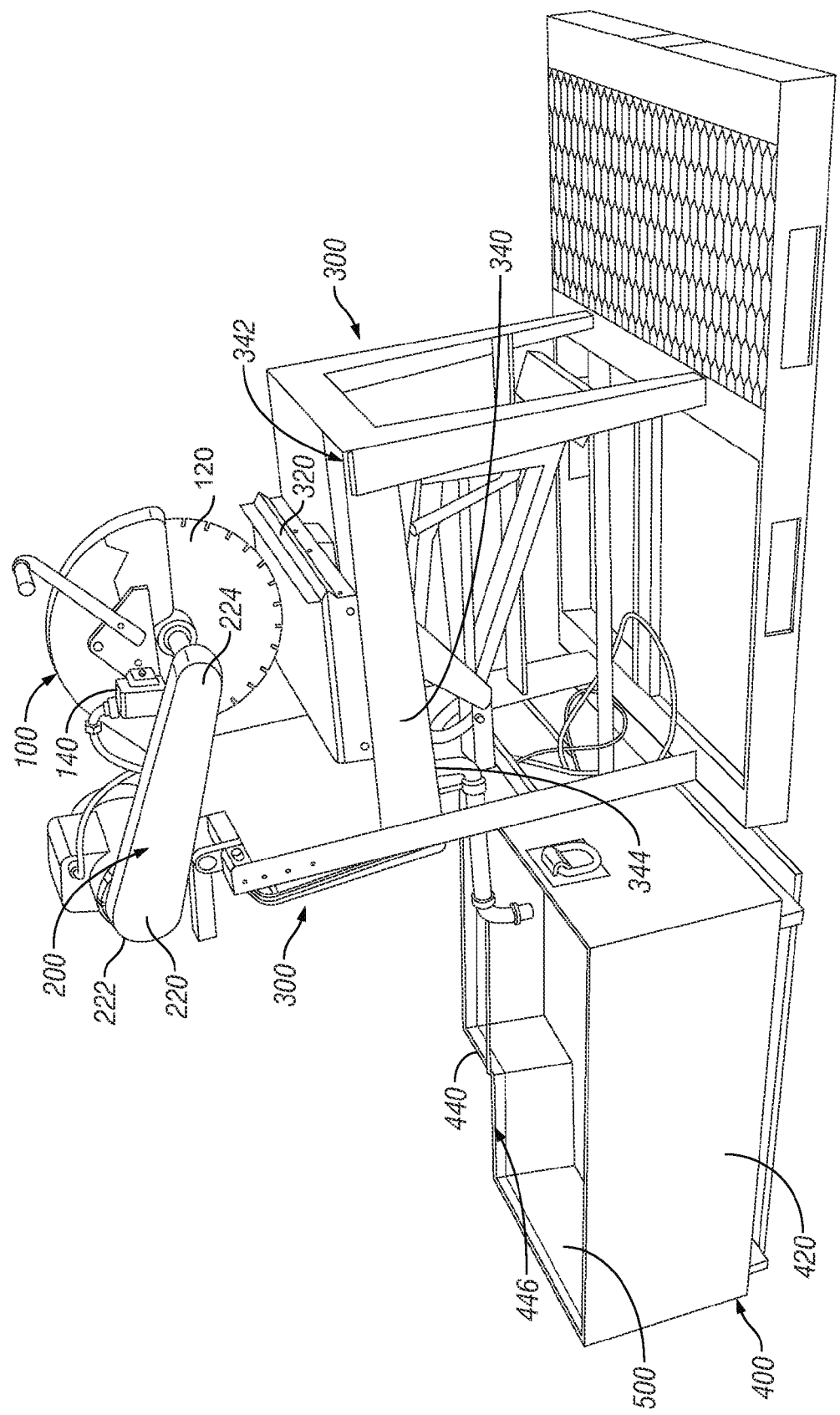

Wet saws are commonly utilized for cutting hard materials, such as concrete, stone, ceramics, tile, etc. In operation, water is applied to the blade to keep the blade and materials cool, and reduce dust and other particulates that may be expelled from the cut during cutting. Because the liquid also lubricates the cut and flushes particulates therefrom, a clean source of water, i.e. one substantially free of particulates, is often essential to making a quality cut without undue breakage. Accordingly, wet saws are often attached to a fresh water source, for example, a faucet. The fresh water source provides a continuous supply of clean water to the saw. However, such wet saws are of limited mobility, as they are required to be near a water source in order to properly operate.

Recirculating wet saws are also known, which filter and recirculate the water expelled during the cutting operation. These wet saws have the advantage that they are not required to be near a water source. One such recirculating wet saw is shown, for example, in U.S. Pat. No. 5,477,844; U.S. Pat. No. 8,347,871; and U.S. Pat. No. 6,557,602, each incorporated herein by reference. However, the water reclamation systems utilized in such wet saws are overly complex, expensive, and inefficient.

It is therefore desirable to provide an improved liquid reclamation and recirculation system for a wet saw cutting apparatus.

SUMMARY OF THE INVENTION

A liquid reclamation and recirculation system for a wet saw cutting apparatus is described herein that overcomes the limitations noted above.

A liquid reclamation and recirculation system for a wet saw cutting apparatus comprises a wet saw having a blade onto which liquid is dispensed by a liquid dispenser adjacent thereto; a first tank for receiving the liquid that has been dispensed onto the blade, the liquid received by the first tank defining a water level of the first tank; a second tank for receiving the liquid at or near the water level of the first tank; wherein the liquid dispensed by the liquid dispenser is drawn from the second tank.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

Illustrated in the accompanying drawing(s) is at least one of the best mode embodiments of the present invention. In such drawing(s):

FIGS. 1-4 illustrate a liquid reclamation and recirculation system for a wet saw cutting apparatus according to an embodiment of the present invention.

DETAILED DESCRIPTION OF THE PREFERRED EMBODIMENTS

The above described drawing figures illustrate the described invention in at least one of its preferred, best mode embodiment, which is further defined in detail in the following description. Those having ordinary skill in the art may be able to make alterations and modifications to what is described herein without departing from its spirit and scope. While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated. Therefore, it should be understood that what is illustrated is set forth only for the purposes of example and should not be taken as a limitation on the scope of the present apparatus and its method of use.

A liquid reclamation and recirculation system for a wet saw cutting apparatus according to at least one preferred embodiment will now be described with reference to FIG. 1.

A wet saw 100 comprises a blade 120, rotatable about an axis for cutting material 10 placed adjacent thereto, and a liquid dispenser 140 for dispensing liquid (preferably water) onto the surface of the blade as it rotates. The blade, which may or may not have teeth, is generally circular and has an axis of rotation that passes through the center of the blade and is orthogonal thereto. The blade may be mounted on and driven by an axle that may be connected to any suitable of motive force.

The wet saw may further comprise a positioning device 200 for positioning the blade relative to the material. In at least one embodiment, the positioning device comprises an arm 220 consisting of a proximal end 222 and a distal end 224. The distal end of the arm may be rotationally coupled to the wet saw, preferably at the axis, so as to effectuate rotation of the blade for cutting the material. The proximal end of the arm may be coupled to a base 300 so as to permit the wet saw to be at least one of vertically and horizontally positionable relative to the material. Preferably, the arm is pivotally coupled to the base; however other connections are expressly contemplated, such as, for example, coupled via linear track.

The liquid dispenser may be positioned proximal the blade at one end, and coupled to a tank assembly 400 at another end. The liquid dispenser feeds liquid from the tank assembly to the blade's surfaces between the center of the blade and the blade's edge. As the blade rotates in use, the liquid being fed to the blade's surface moves out the blade's edge under the centrifugal forces generated by the rotating blade. The liquid dispenser may further comprise a nozzle and/or nozzles located on either side of the blade for dispensing liquid onto the surfaces of the blade; however, any other suitable arrangement for dispensing liquid to the blade may be employed.

The base may further comprise a cutting area 320 for positioning material to be cut thereon, the cutting area positioned above a catch 340 for receiving liquid and particulates (i.e. slurry) expelled by the saw. The cutting area preferably comprises a flat surface having an aperture for accepting the blade during cutting, and may be removably and/or adjustably coupled to the base. The cutting area may further comprise a guide for positioning the material relative to the surface and/or the blade.

The catch preferably comprises a floor 342 having at least one slurry intake 344 therein. The slurry expelled by the saw may be received by the catch, held therein, and directed to the intake. In at least one embodiment, the floor is angled towards the intake and the slurry is directed thereto by the operation of gravity. However, any other suitable arrangement for directing the slurry into the intake may be employed.

The catch may further comprise at least one wall extending vertically upward from the floor for containing the received slurry within the catch. In at least one embodiment, the at least one wall supports the cutting area thereon and maintains a space between the catch floor and the cutting area.

In at least one embodiment, the slurry intake directs the received slurry to the tank assembly for processing, i.e. the substantial removal of particulates from the slurry so as to provide clean water therefrom. Accordingly, the slurry intake preferably comprises plumbing (i.e. pipes, drains, fittings, valves, valve assemblies, pumps, etc.) sufficient to direct the slurry to the tank assembly. In at least one embodiment, the slurry intake consists of a single pipe assembly that directs the slurry, via gravity, from the catch to the tank assembly.

The tank assembly 400 according to at least one preferred embodiment will now be described with reference to FIG. 2.

The tank assembly comprises a first tank 420 coupled to a second tank 440.

The first tank may comprise a floor 422 and at least one wall 424 extending vertically therefrom so as to form a vessel for holding a specified volume of liquid and/or particulates defining a water level 500 of the first tank. The intake may be positioned adjacent the first tank such that the intake provides slurry from the catch to the first tank. In at least one embodiment, the intake is positioned adjacent the at least one wall distally from the floor of the tank, however, any other suitable arrangement for directing the slurry into the first tank may be employed.

As discussed above, the first tank may be operable to hold a volume of liquid and/or particulates such that the volume defines a water level of the first tank. Likewise, the second tank may also be operable to hold a volume of liquid and/or particulates such that the volume defines a water level of the second tank. The water level of the first tank and the second tank may or may not be equivalent.

In at least one preferred embodiment, the dimensions of the first tank are such that the liquid and/or particulates held by the first tank are permitted to separate. That is, the slurry is preferably permitted to become essentially stagnant and thereby separate into its liquid and particulate components, the particulates settling to the floor of the first tank and leaving substantially cleaner liquid at the water level. It is important to note that the presently described embodiment does not require the liquid and particulate components be one-hundred percent separated, but only that the resulting liquid at the water level be substantially cleaner (i.e. free of particulates) than the slurry provided to the first tank. To this end, in at least one embodiment, the intake is positioned such that the introduction of slurry into the first tank minimizes stirring up and re-mixing the slurry already present in the first tank.

The second tank may comprise a floor 442 and at least one wall 444 extending vertically therefrom so as to form a vessel for holding a specified volume of liquid and/or particulates defining the water level 500 of the second tank.

As shown in FIG. 1, in at least one embodiment, the at least one wall of the second tank and the at least one wall of the first tank comprise a common wall having a spillage area 480 located at or near the water level of the first tank for permitting the cleaner liquid at the water level to transfer to the second tank. In this manner, the second tank is provided with the cleaner liquid of the first tank. Additionally, as with the first tank, the dimensions of the first tank may be such that the liquid and/or particulates held by the second tank are permitted to further separate. That is, the cleaner liquid is permitted to become essentially stagnant and thereby further separate into its liquid and particulate components, the particulates settling to the floor of the second tank and leaving even cleaner liquid at the water level of the second tank. To this end, in at least one embodiment, the spillage area is positioned such that the introduction of cleaner liquid into the second tank minimizes stirring up and re-mixing the liquid and/or particulates already present in the second tank.

It is important to note that the process described herein may be performed with any number of second tanks in succession, each iteration further separating the remaining particulates from the transferred liquid such that the last second tank in the sequence contains liquid at or near its water level that is substantially free of particulates and is therefore suitable for use with the wet saw, as described herein.

In at least one embodiment, the liquid dispenser may be coupled to second tank at or near the water level of the second tank, so as to retrieve the cleaner liquid from the second tank and provide it to the blade as described herein. Accordingly, the liquid dispenser may further comprise a pump 142 and tubing 144, the pump forcing the cleaner liquid through the tubing so as to feeds the liquid from the tank assembly to the blade.

It is important to note that while the embodiments described herein are described with reference to first and second tanks, such nomenclature is not intended to limit the invention to two tanks; a plurality of successive tanks is expressly contemplated. Moreover, the successive tanks may be arranged according to any geometry consistent with the descriptions herein. Some exemplary geometries include circular, linear and/or rectangular geometries of successive tanks.

Moreover, while the present invention is described with reference to spillage areas, any other suitable arrangement for directing the liquid at or near the water level of the first tank to the second tank may be employed. Additionally, other devices known in the art to further the filtering of particulates from liquid, e.g. screens, filters, troughs, etc., may be employed concurrently with the present invention without departing from the scope thereof.

Figure 2:
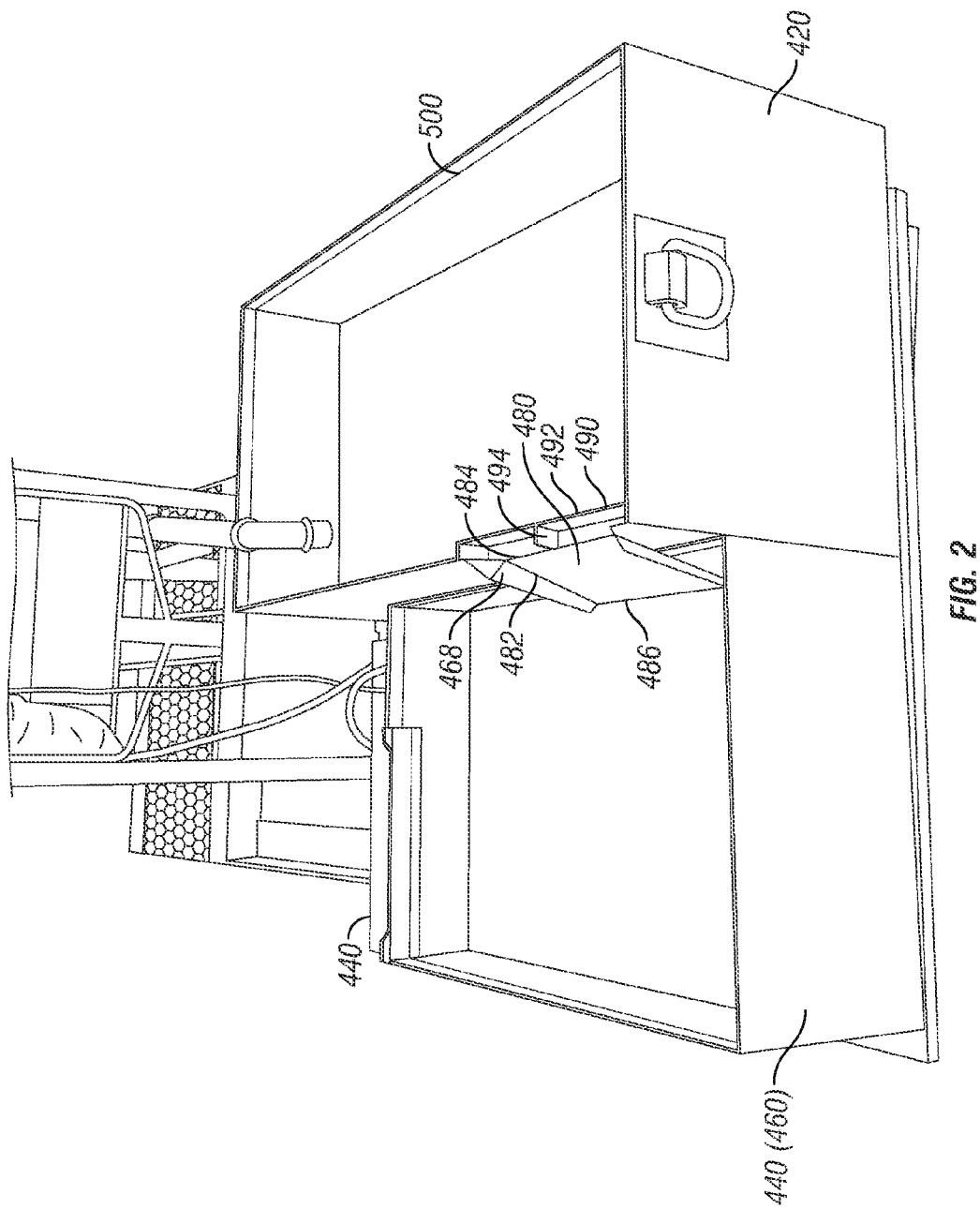

FIG. 2 illustrates an exemplary tank assembly 400 comprising first, or primary, tank 420, second, or intermediary, tank 440 and third, or terminal, tank 460 successively arranged according to at least one embodiment.

The at least one wall of the second tank and the at least one wall of the first tank may comprise a common wall having the spillage area located at or near the water level of the first tank for permitting the cleaner liquid at the water level to transfer to the second tank, according to the principles described herein. Moreover, the at least one wall of the second tank and the at least one wall of the third tank may comprise a common wall having the spillage area located at or near the water level of the second tank for permitting the cleaner liquid at the water level to transfer to the third tank, according to the principles described herein. The liquid dispenser may be coupled to third tank so as to retrieve the cleaner liquid from the third tank and provide it to the blade according to the principles described herein. Importantly, the pump may be located at or near the water level of the third tank, but alternatively, may be located anywhere it can retrieve cleaner liquid for recirculation to the wet saw. Moreover, while the tanks are described herein as comprising a common wall, walls that are not common between tanks are also contemplated, and indeed may be achieved without departing from the scope of the invention.

Figure 3:
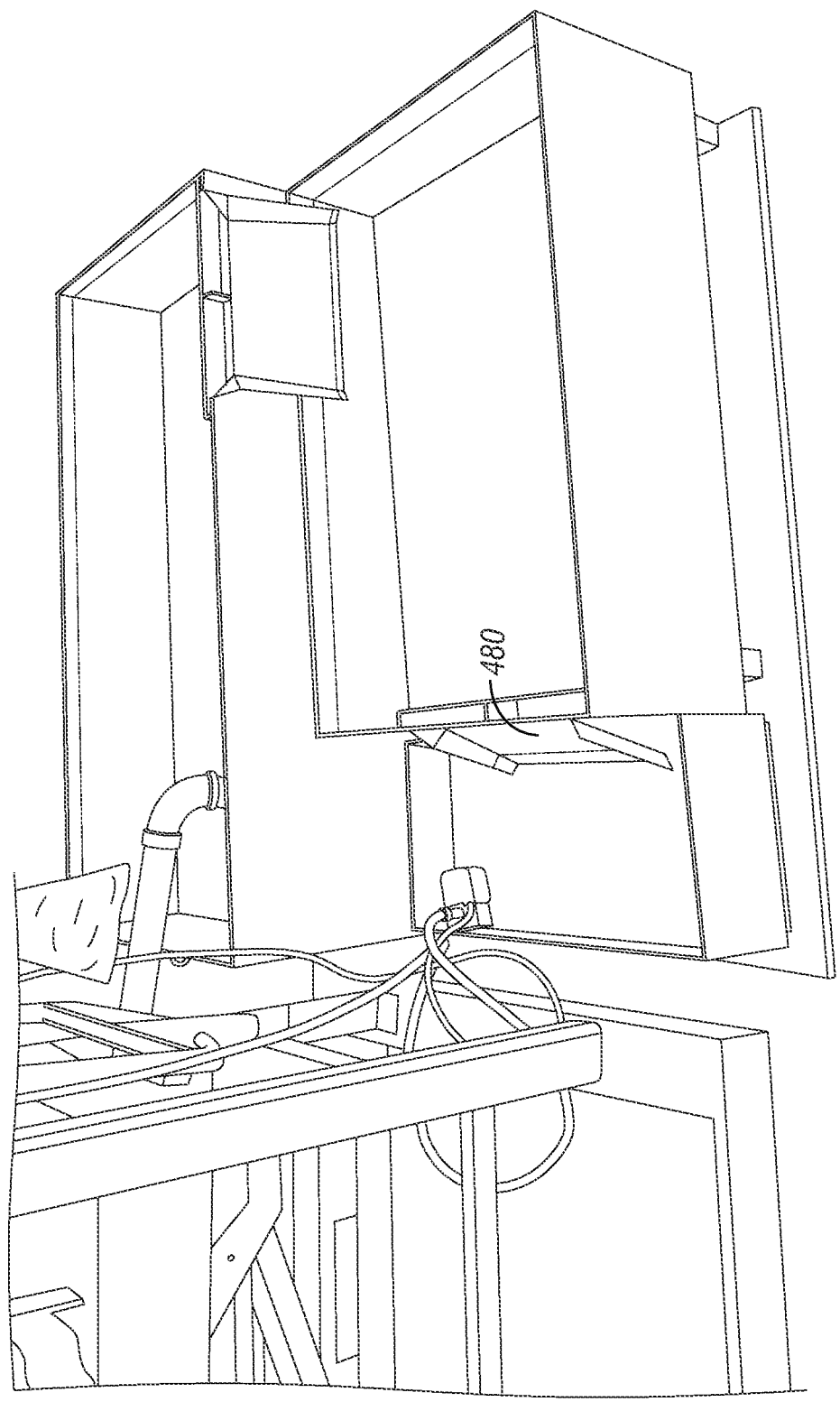

As shown for example in FIG. 3, the tank assembly may comprise successive tanks in which each tank in the succession provides the next tank in the succession with successively cleaner liquid according to the principles described herein. FIG. 3 illustrates a box-helix geometry similar to that of a helical staircase. However, successive tanks may be arranged according to any geometry consistent with the principles described herein.

Figure 4:
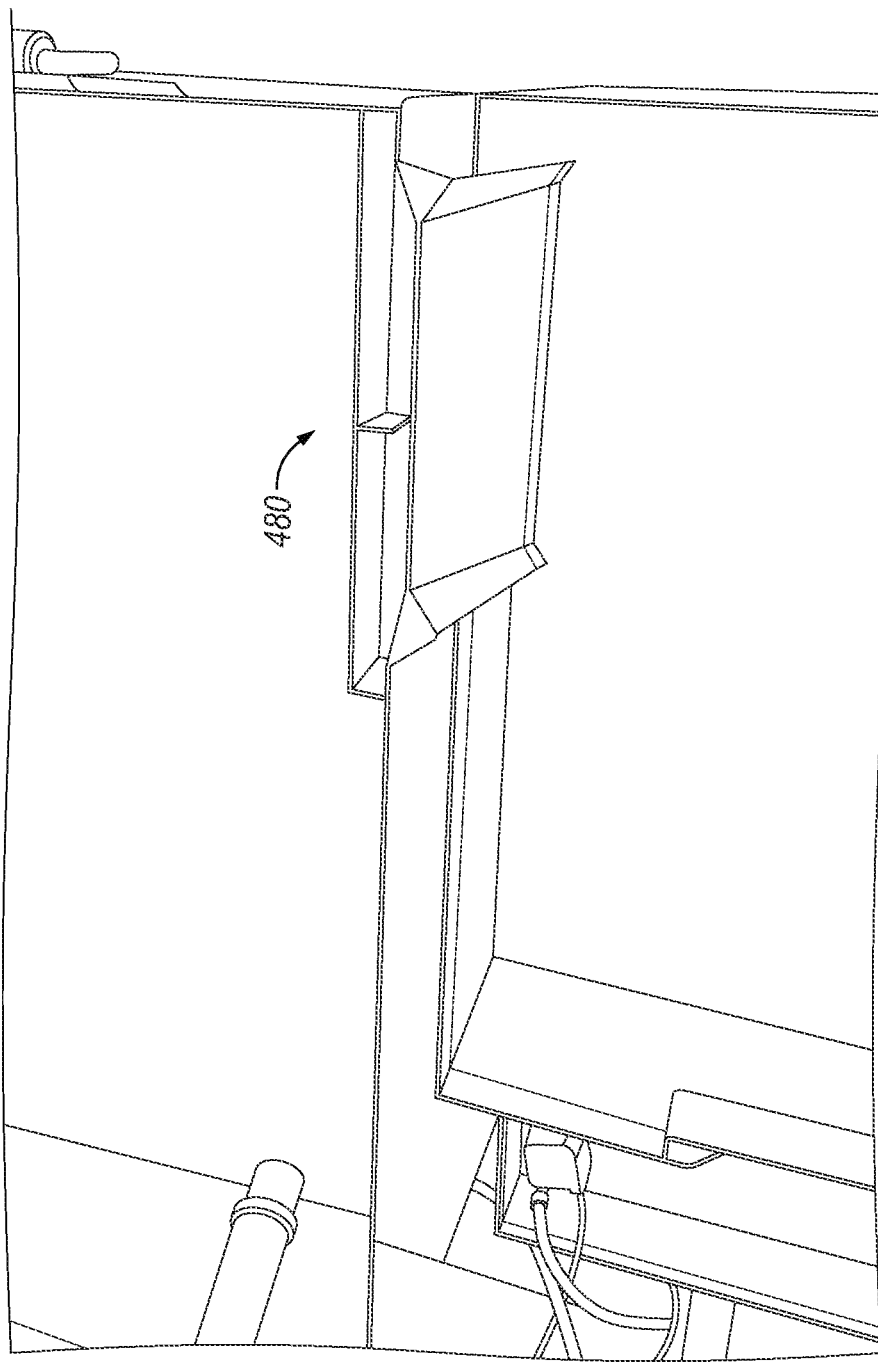

FIG. 4 illustrates an exemplary spillage area according to at least one embodiment. The spillage area comprises a chute 482 for receiving liquid from the first tank that is at or near the water level of the first tank and transferring the liquid to the second tank via gravity. The chute preferably comprises a straight entry transition type chute having a first edge 484 integral with the at least one wall and positioned at or near the water level of the first tank, as second edge 486 opposite thereto positioned adjacent the second tank, below the water level of the first tank, and opposing side guards 488 positioned therebeween for preventing liquid from exiting the chute at any place other than the second edge.

The spillage area may also comprise a jetty 490 for regulating the liquid entering the spillage area, and comprising a substantially flat, elongate member 492 positioned horizontally and substantially parallel to the at least one wall, and extending at least the length of the first edge. The elongate member may be affixed to the at least one wall via one or more support members 494 extending perpendicular therebetween. The jetty may also extend vertically below the water level.

The enablements described in detail above are considered novel over the prior art of record and are considered critical to the operation of at least one aspect of the invention and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that the named inventor believes that the claimed subject matter is what is intended to be patented.

What is claimed is:

1. A liquid reclamation and recirculation system for a wet saw cutting apparatus comprising:
    a wet saw having a blade onto which liquid is dispensed by a liquid dispenser adjacent thereto;
    a first tank which receives only the liquid that has been dispensed onto the blade, a volume of the received liquid defining a water level of the first tank;
    a second tank which receives only a top portion of the liquid volume that is at or near the water level of the first tank;
    wherein the liquid dispensed by the liquid dispenser is drawn only from the second tank.

2. The system of claim 1, wherein the liquid dispenser comprises a pump and tubing coupled to the second tank, the pump forcing the liquid from the second tank onto the blade via the tubing.

3. The system of claim 1, wherein the first tank and the second tank comprise a common wall.

4. The system of claim 3, wherein the common wall comprises a spillage area for transferring the liquid at or near the water level of the first tank to the second tank.

5. The system of claim 1, further comprising an intermediate tank for receiving the liquid at or near the water level of the first tank, the liquid received by the intermediate tank defining a water level of the intermediate tank; and wherein the second tank receives liquid at or near the water level of the intermediate tank.

6. The system of claim 5, wherein the first tank and the intermediary tank comprise a first common wall, and the intermediary tank and the second tank comprise a second common wall.

7. The system of claim 6, wherein the first and the second common walls each comprise a spillage area for transferring the liquid at or near the water level of the first tank to the second tank.

* * * * *